United States Patent [19]

Hayakawa et al.

[11] Patent Number: 4,794,130

[45] Date of Patent: Dec. 27, 1988

[54] METHOD FOR GRAFT POLYMERIZATION OF ACETYLENE COMPOUND ON A SHAPED POLYMER ARTICLE

[75] Inventors: Kiyoshi Hayakawa, Gifu; Hiromi Yamakita, Asahi; Masato Tazawa; Hiroshi Taoda, both of Nagoya, all of Japan

[73] Assignees: Agency of Industrial Science and Technology; Ministry of International Trade and Industry, both of Tokyo, Japan

[21] Appl. No.: 31,368

[22] Filed: Mar. 30, 1987

[30] Foreign Application Priority Data

May 16, 1986 [JP] Japan ................................ 61-113047

[51] Int. Cl.$^4$ .................... C08F 2/50; C08F 255/02
[52] U.S. Cl. ........................................ 522/33; 522/37; 522/46; 522/47; 522/48; 522/70; 522/125; 522/131; 522/133; 525/275
[58] Field of Search ............... 522/124, 125, 131, 133, 522/33; 525/275

[56] References Cited

U.S. PATENT DOCUMENTS 3,598,708  8/1971  Jackson ............................ 522/133
4,267,202  5/1981  Nakayama ........................ 427/44
4,425,206  1/1984  Hutchinson ...................... 522/131
4,593,050  6/1986  Cohen .............................. 522/131

FOREIGN PATENT DOCUMENTS 4923582  6/1974  Japan ................................ 525/275

OTHER PUBLICATIONS

Kagiya, Property Improvement of Polyolefins ..., (translation of previously cited Jap. Atomic Energy Patent).
Chemical Abstracts; Kurbanov et al., Radiation Grafting of Phenylacetylene and Methyl Methacrylate to Khlorin Fiber, 1972, vol. 81, p. 63.

Primary Examiner—John C. Bleutge
Assistant Examiner—David Buttner
Attorney, Agent, or Firm—Oblon, Fisher, Spivak, McClelland & Maier

[57] ABSTRACT

A shaped article of halogenated polymer which is obtained by causing a halogen to react upon a shaped article of a polymer by irradiation of light is irradiated with light in the presence of an acetylene compound to have the acetylene compound graft polymerized onto the shaped article of polymer.

4 Claims, 3 Drawing Sheets

METHOD FOR GRAFT POLYMERIZATION OF ACETYLENE COMPOUND ON A SHAPED POLYMER ARTICLE

FIELD OF THE INVENTION AND RELATED ART STATEMENT

This invention relates to a method for the production of a composite-functional material. More particularly, this invention relates to a method for the production of a shaped article of a functional polymer which is a shaped polymer article having grafted thereon polymerized acetylene compound.

The term "composite-functional material" as used herein means a macromolecular material produced by the combination of different macromolecular substances and possessing at least one of various functions (such as electric function and chemical function). The term "shaped article of functional polymer" as used herein means a shaped article of polymer (such as film or fibers) which is capable of any of various functions (such as electric function or chemical function).

Since an acetylene compound possesses a triple bond, a linear polymer of the compound has numerous double bonds in conjugation. The linear polymer, therefore, is considered to possess different qualities as in conductivity or semiconductivity from the conventional polymers. Various observations on polyacetylene, for example, have been reported in such publications as J. C. W. Chien, "Polyacetylene", Academic Press, New York, 1984; D. MacInnes et al., J. Chem. Soc., Chem. Commun., 317 (1981); M. Maxfield et al., J. Electrochem. Soc., 133, 117 (1986); and J. C. Clarks et al., J. Chem. Soc., Chem. Commun., 384 (1981).

Generally monoacetylene derivatives have poor polymerizability and, even through the agency of radiation, barely produce low molecular compounds. They produce high molecular polymers only when the polymerization is carried out in the presence of a specific catalyst. They are not easily enabled to produce graft polymers by such a method as has heretofore been employed in the polymerization of ordinary vinyl monomers. In the circumstances, no technique for polymerizing such an acetylene compound thereby producing a polymer having a desired surface functionality has ever existed to date.

OBJECT AND SUMMARY OF THE INVENTION

The inventors have found that a desired article of a functional polymer is obtained by preparatorily introducing a readily photoreactive group into a shaped article of polymer and subsequently causing cleavage of the group and, at the same time, initiating polymerization of an acetylene compound upon the shaped article of polymer thereby allowing the acetylene compound to be graft polymerized onto the shaped article of polymer. They have perfected the present invention as the result.

To be specific, the present invention is directed to a method for the graft polymerization of an acetylene compound to a shaped article of polymer, which comprises keeping the shaped article of polymer in contact with at least one molecular halogen, irradiating the shaped article of polymer and the at least one molecular halogen as held in mutual contact with light thereby giving rise to a shaped article of halogenated polymer, and further irradiating the shaped article of halogenated polymer with light in the presence of an acetylene compound in a vaporous form thereby causing the acetylene compound to be graft polymerized onto the shaped article of halogenated polymer.

DETAILED DESCRIPTION OF THE PREFERRED EMBODIMENTS

Figure 1:
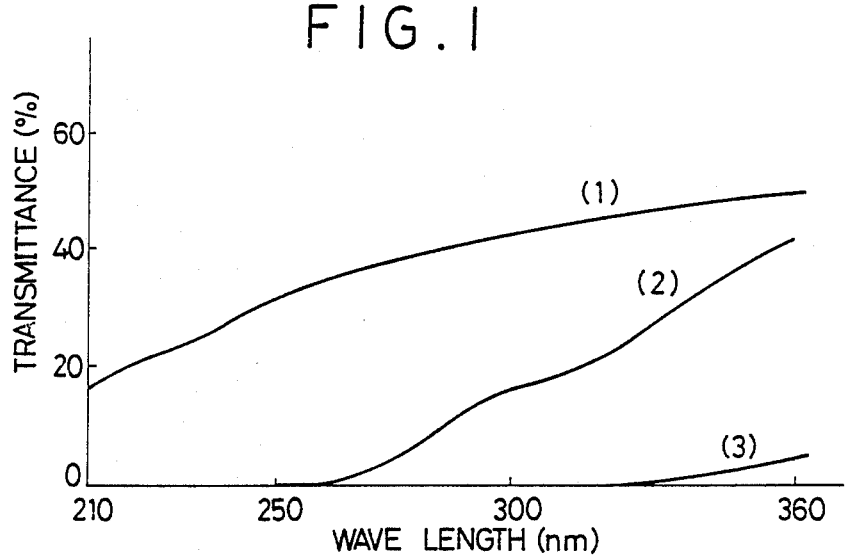
FIG. 1 illustrates ultraviolet absorption spectra showing that the product produced in Example 1 in accordance with the method of the present invention was a polyethylene film having phenyl acetylene graft polymerized thereon.

The essential requirements for the present invention will be described in detail below.

Examples of the polymer to be used for the shaped article of polymer include polyolefins such as polyethylene and polypropylene, halogen-containing polymers such as polyvinyl chloride, polyvinylidene chloride, polytetrafluoroethylene, polyvinyl fluoride, and polyvinylidene fluoride, and polyesters, polyamides (nylon), polycarbonates, polysulfones, polyimides, cellophane, and cellulose acetate. Since the present invention intends primarily to effect the reaction only in the surface layer of the shaped article of polymer, the shaped article of polymer is desired to be in the form of film, sheet, or fibers, for example. The description will now be continued with reference to a polymer film, for example.

A film of the polymer of the foregoing description is placed as held in contact with a molecular halogen and irradiated in situ with light to bind the halogen with the film. As the halogen, chlorine (gas), bromine (liquid), or iodine (solid) can be used in the unmodified form thereof.

This reaction can be easily effected by any known method. For reaction with chlorine, for example, the polymer film is set in a container and chlorine is introduced into the container until the air in the container has been displaced with the chlorine. When bromine is selected for reaction, since it is in a liquid form at normal room temperature, the polymer film and a container holding bromine are placed together in a reaction container and the reaction container is cooled and, at the same time, evacuated and subsequently allowed to return to normal room temperature. As a result, the vaporized bromine fills up the reaction container and comes into contact with the polymer film. In the case of iodine, although it is in a solid form at normal room temperature, it can be similarly converted into a vapor through sublimation and brought into contact with the polymer film. The container holding the polymer and the halogen is kept sealed. This container is made of quartz glass or Pyrex glass which is pervious to light. For the irradiation of the reaction system, the ultraviolet light as from a mercury vapor lamp, the visible ray as from a tungsten lamp or xenon lamp, or the solar ray can be used. After the irradiation, the container is opened and the treated polymer film is taken out of the container and dried in a stream of air. Since the stream of air carries the unaltered adsorbed halogen from the polymer film, the polymer film which remains after the drying can be used without any modification in the second step of reaction. Owing to the reaction with the halogen, the polymer film gains in weight.

Then, the halogenated polymer film is kept in contact with the vapor of an acetylene compound and irradiated in situ with light. Examples of the acetylene compounds effectively usable in the present invention include acetylene, phenyl acetylene, hydroxy-, carboxy-, nitro- and amino-substituted compounds of either of these, and other similar substituents, diacetylene and derivatives thereof.

The placement of this acetylene compound in contact with the halogenated polymer film can be effected, for example, by the following method. First, the halogenatd polymer film is set in place along the inner wall of a transparent quartz tube or glass tube to ensure convenience in the irradiation thereof with light and a container holding therein a small amount of the acetylene compound disposed on the bottom or at the center of the tube. Then, the tube is evacuated and sealed. As a result, the tube interior is filled up with the vapor of the acetylene compound and the adsorption of this compound on the halogenated polymer film proceeds at the same time. In this case, the acetylene compound may be in a liquid form or in a solid form. After a fixed length of time, the reaction tube is kept rotated and the contents thereof are exposed to an external light. The source of the light thus used for the irradiation may be a mercury vapor lamp, a tungsten lamp, a xenon lamp, or some other similar artificial light source. Optionally, solar rays may be used for the irradiation. After this irradiation, the polymer film is taken out of the container and left drying in a stream of air to expel the unaltered acetylene compound. Consequently, the polymer film which has the acetylene compound graft polymerized thereon is obtained. When necessary, this polymer film may be washed with a solvent such as benzene, methanol, or acetone, and then left drying in a stream of air.

During the course of the irradiation with light which constitutes the second step of treatment, a photosensitizer such as acetophenone, benzophenone, benzil, benzoquinone, naphthalene or naphthoquinone may be additionally used, when necessary, in the reaction. In this case, the photosensitizer may be sorbed preparatorily on the film as by immersing this film in the solution of this photosensitizer. Otherwise, the photosensitizer and the acetylene compound may be simultaneously sorbed on the film by bringing the photosensitizer, acetylene compound and film into simultaneous contact with each other. The fact that the acetylene derivative is graft polymerized onto the shaped article of polymer obtained by the method of the present invention has been confirmed by the ultraviolet absorption spectrum, the infrared absorption spectrum, and the photo-acoustic spectrum.

The polymer film produced as described above with the acetylene compound graft polymerized thereon can be advantageously used as a conductive film or an antistatic film, for example.

Acetylene compounds have poor polymerizability. When a polymer film is irradiated with light in the presence of the vapor of the acetylene compound, therefore, this compound cannot be chemically grafted onto the polymer film. By the method of this invention which uses halogenation as a preparatory step, it is made possible to graft polymerize a desired acetylene derivative onto the polymer film. This invention can be applied not only to the film but also to various shaped articles of polymer. For example, from the general-purpose film, a conductive film or an antistatic film can be economically produced by the method of this invention.

Now, the present invention will be described more specifically below with reference to working examples.

EXAMPLE 1

Figure 4:
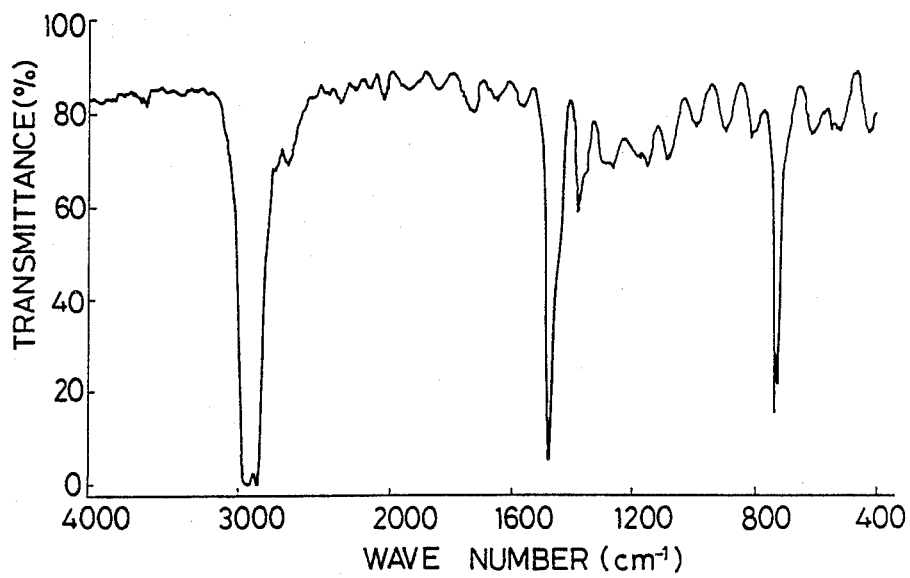
FIG. 4 is an infrared absorption spectrum of a brominated polyethylene film.
Figure 5:
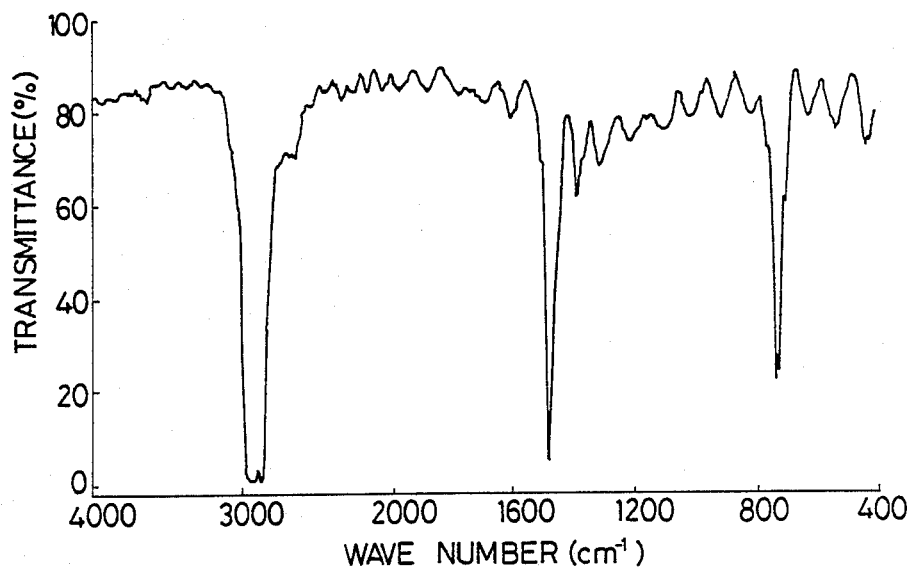
FIG. 5 is an infrared absorption spectrum of a polyethylene film having phenyl acetylene graft polymerized thereon.

A low-density polyethylene film (22 $\mu$m in thickness) was cleaned with a surfactant, then washed with water, and dried. A section $8\times 8$ cm in area (216.9 mg in weight) was cut from the dry film and applied fast onto the inner wall of a transparent test tube of quartz fitted with a ground joint. A small transparent test tube of quartz containing 0.1 ml of bromine was placed in the central part of the first test tube. The test tube was cooled with liquefied nitrogen and, at the same time, evacuated to $10^{-3}$ mmHg, and then sealed. The test tube was left standing overnight and then rotated at a speed of 60 turns per minute and, at the same time, irradiated for 19 hours with the whole light emitted from a chemical grade mercury vapor lamp, produced by Toshiba and marketed under Product Code of "SHL-100-UV-2", placed at a distance of 10 cm from the tube. After the irradiation, the film was taken out of the test tube, dried in a stream of air, and weighed. This film had a weight of 248.0 mg, representing an increase of 14.8% from the initial weight. A strip $8\times 1.5$ cm in area (42.0 mg in weight) was cut from the treated section of film, applied fast similarly onto the inner wall of the transparent test tube of quartz fitted with a ground joint. A small transparent test tube of quartz containing 0.1 g of benzophenone (photosensitizer) and 0.2 ml of phenyl acetylene was placed in the central part of the first test tube. With liquefied nitrogen, the test tube was simultaneously cooled and evacuated and then sealed tightly. Under the same conditions as in the first step, the contents of the test tube were irradiated for 19 hours. Then, the test tube was opened and the strip of film was washed repeatedly with benzene and methanol, and dried under vacuum. The film consequently obtained weighed 41.2 mg, representing a slight decrease of weight, and assumed a grayish brown color. It is noted from the ultraviolet absorption spectra shown in FIG. 1, the visible absorption spectra shown in FIG. 2 and the infrared absorption specrtra shown in FIGS. 3, 4 and 5 that a shaped polymer article having an acetylene compound graft polymerized thereon has been obtained by the method of the present invention.

Figure 2:
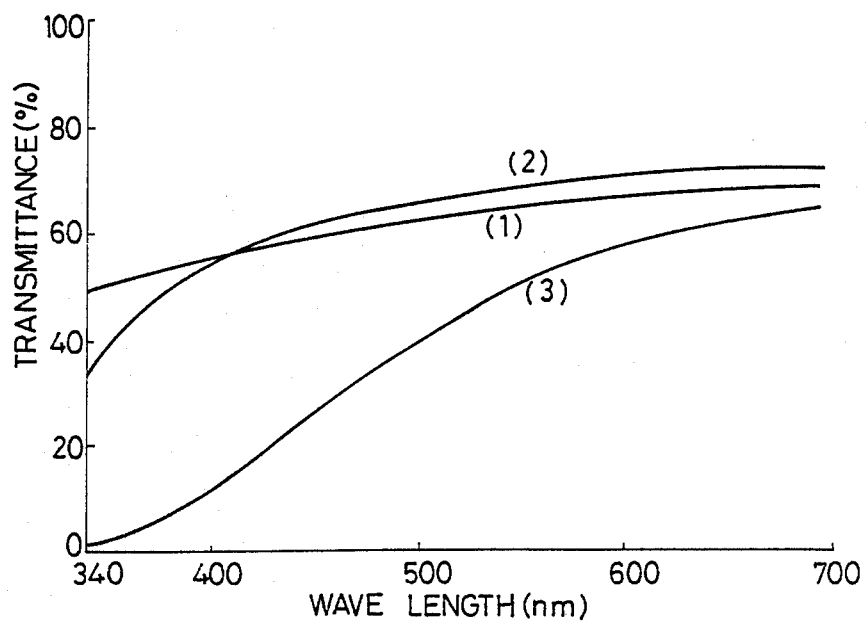
FIG. 2 illustrates visible absorption spectra showing that the aforementioned product was a polyethylene film having phenyl acetylene graft polymerized thereon.
Figure 3:
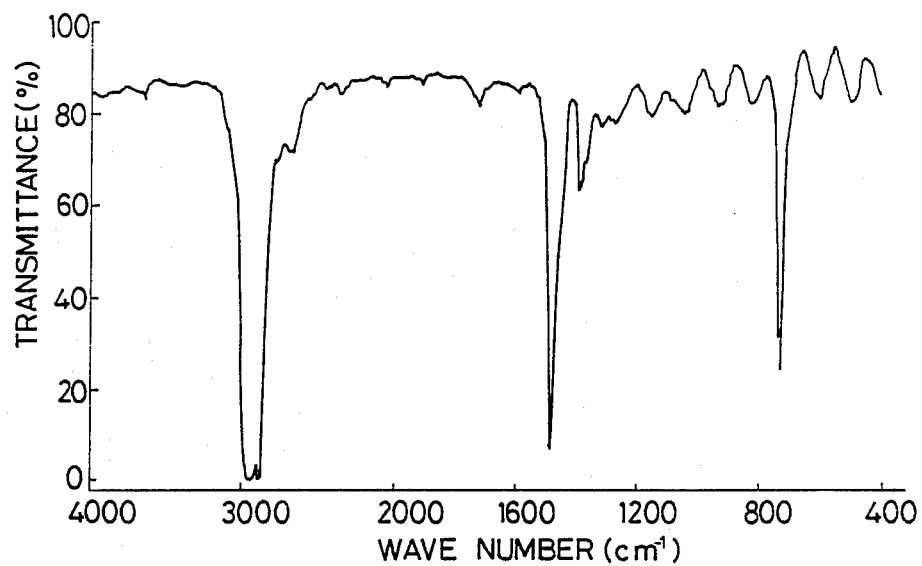
FIG. 3 is an infrared absorption spectrum of the polyethylene film used as the raw material.

FIG. 1 illustrates ultraviolet absorption spectra and FIG. 2 visible absorption spectra. In these diagrams, (1) represents a polyethylene film used as the raw material, (2) a brominated polyethylene film, and (3) a polyethylene film having phenyl acetylene graft polymerized thereon. FIG. 3 is an infrared absorption spectrum of the polyethylene film used as the raw material, FIG. 4 an infrared absorption spectrum of a brominated polyethylene film, and FIG. 5 an infrared absorption spectrum of a polyethylene film having phenyl acetylene graft polymerized thereon. In FIG. 1 and FIG. 2, the polyethylene films having phenyl acetylene graft polymerized thereon show remarkable increases in the absorptions of the ultraviolet and visible zones due to the phenyl group and the conjugate double bond. Further in FIGS. 3, 4 and 5, the brominated polyethylene shows variations of relative intensity at 730 cm$^{-1}$ and 740 cm$^{-1}$ as compared with the polyethylene used as the raw material, and the polyethylene having phenyl acetylene graft polymerized thereon shows new absorptions due to phenyl acetylene at 710 cm$^{-1}$ and 770 cm$^{-1}$. In the present invention, the bromine content in the brominated polyethylene film was 12.5% by weight and the phenyl acetylene content in the graft polymerized film was 10.8% by weight.

EXAMPLE 2

From a brominated polyethylene film 43.6 mg in weight, a grafted film 42.8 mg in weight was obtained by following the procedure of Example 1, except that the small test tube of quartz used for the irradiation in the latter step of treatment contained 0.2 mg of phenyl acetylene alone. A decrease in weight was observed similarly to Example 1, and the produced film assumed a grayish brown color. By the ultraviolet visible absorption spectrum and the infrared absorption spectrum, this film was confirmed to be a polyethylene film having phenyl acetylene graft polymerized thereon. The phenyl acetylene content in the graft polymerized film was 10.2% by weight.

COMPARATIVE EXPERIMENT

The amount 51.0 mg of the same polyethylene film as used in Example 1 was applied fast onto the inner wall of a transparent test tube of quartz and 0.2 ml of phenyl acetylene was placed at the bottom of the test tube. The test tube was cooled with liquefied nitrogen and, at the same time, evacuated to 10$^{-8}$ mmHg and then sealed tightly. The contents of the test tube were irradiated for 20 hours with the light from a chemical grade mercury vapor lamp, marketed under Product Code of "SHL-100-UV-2", placed at a distance of 10 cm from the test tube. After the irradiation, the test tube was opened and the film removed from the test tube was dried in draft. The film weighed 50.8 mg and assumed no color. By measurement of absorption spectra, no occurrence of any graft reaction was confirmed.

EXAMPLE 3

172.1 mg of the same low density polyethylene film as used in Example 1 was treated in the same manner as in Example 1. A section 8×7 cm in area (171.1 mg in weight) was cut from the treated polyethylene film. The steps of evacuation of the test tube, sealing of the evacuated test tube, and irradiation of the contents of the test tube with the light from the mercury vapor lamp were carried out by faithfully following the corresponding steps of Example 1, except that 0.1 g of iodine crystals were used in place of 0.1 g of bromine. The produced film was dried in a stream of air to give rise to 173.6 mg of iodinated polyethylene film, representing an increase of 0.87% in weight. This iodinated polyethylene film was treated in the same manner as in Example 1 to produce a polyethylene film having phenyl acetylene graft polymerized thereon.

What is claimed is:

1. A method for graft polymerizing phenylacetylene onto a shaped polyethylene article, which consists essentially of:
   mutually contacting said shaped polyethylene article and at least one of bromine or iodine in molecular form;
   irradiating said shaped polyethylene article in mutual contact with said halogen, thereby forming a halogenated shaped polyethylene article; and
   irradiating said shaped, halogenated polyethylene article with light in the presence of a polymerizable monomer in the vapor phase consisting essentially of phenylacetylene thereby graft polymerizing said phenylacetylene onto said shaped, halogenated polyethylene article.

2. The method of claim 1, wherein said irradiation of said shaped article of halogenated polyethylene in the presence of the vapor of phenylacetylene is carried out in the additional presence of a photosensitizer.

3. The method of claim 2, wherein said photosensitizer is at least one member selected from the group consisting of acetophenone, benzophenone, benzil, benzoquinone, naphthalene, and naphthoquinone.

4. A method for graft polymerizing phenylacetylene onto a shaped polyethylene article, which consists of:
   mutually contacting said shaped polyethylene article and at least one of bromine or iodine in molecular form;
   irradiating said shaped polyethylene article in mutual contact with said halogen, thereby forming a halogenated shaped polyethylene article; and
   irradiating said shaped, halogenated polyethylene article with light in the presence of a polymerizable monomer in the vapor phase consisting essentially of phenylacetylene, thereby graft polymerizing said phenylacetylene onto said shaped, halogenated polyethylene article.

* * * * *